United States Patent
Lee et al.

(10) Patent No.: US 9,820,290 B2
(45) Date of Patent: Nov. 14, 2017

(54) VIRTUAL ANTENNA MAPPING METHOD AND APPARATUS FOR FEEDBACK OF VIRTUAL ANTENNA MAPPING INFORMATION IN MIMO SYSTEM

(71) Applicant: Samsung Electronics Co., Ltd., Gyeonggi-do (KR)

(72) Inventors: Keonkook Lee, Gyeonggi-do (KR); Chanhong Kim, Gyeonggi-do (KR); Taeyoung Kim, Gyeonggi-do (KR); Jjiyun Seol, Gyeonggi-do (KR); Jaeseung Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 238 days.

(21) Appl. No.: 14/636,863

(22) Filed: Mar. 3, 2015

(65) Prior Publication Data

US 2015/0312919 A1 Oct. 29, 2015

(30) Foreign Application Priority Data

Mar. 3, 2014 (KR) .................... 10-2014-0025126

(51) Int. Cl.
| | | |
|---|---|---|
| *H04W 72/08* | (2009.01) | |
| *H04B 7/04* | (2017.01) | |
| *H04L 1/00* | (2006.01) | |
| *H04L 5/00* | (2006.01) | |
| *H04W 24/10* | (2009.01) | |

(Continued)

(52) U.S. Cl.
CPC ........ *H04W 72/085* (2013.01); *H04B 7/0417* (2013.01); *H04B 7/0473* (2013.01); *H04B 7/0647* (2013.01); *H04L 1/0003* (2013.01); *H04L 5/0048* (2013.01); *H04W 24/10* (2013.01)

(58) Field of Classification Search
CPC .. H04W 72/085; H04W 24/10; H04B 7/0417; H04B 7/0473; H04B 7/0647; H04L 1/0003; H04L 5/0048
USPC ........................................................ 370/252
See application file for complete search history.

(56) References Cited

U.S. PATENT DOCUMENTS

| 2007/0041464 A1 | 2/2007 | Kim et al. |
| 2009/0238250 A1 | 9/2009 | Kangas et al. |

(Continued)

OTHER PUBLICATIONS

International Search Report dated May 27, 2015 issued in counterpart application No. PCT/KR2015/002040.

*Primary Examiner* — Stephen J Clawson
(74) *Attorney, Agent, or Firm* — The Farrell Law Firm, P.C.

(57) ABSTRACT

A Virtual Antenna Mapping (VAM) method of a base station and a transmission apparatus equipped with M physical antennas and Q Transceiver Units (TXRUs) are provided. The method includes transmitting Reference Signals (RSs) arranged differently according to respective VAM patterns to a terminal in a transmission mode supporting N logical antennas; receiving a feedback including information regarding a VAM pattern selected as a result of channel measurement with respect to the RSs transmitted according to the VAM pattern from the terminal; and transmitting a signal to the terminal through the M physical antennas by applying the selected VAM pattern, wherein the selected VAM pattern maps N data streams corresponding to the N logical antennas to the M physical antennas through the Q TXRUs.

26 Claims, 15 Drawing Sheets

(51) Int. Cl.
*H04B 7/0417* (2017.01)
*H04B 7/06* (2006.01)

(56) References Cited

U.S. PATENT DOCUMENTS

| | | | |
|---|---|---|---|
| 2010/0195615 A1* | 8/2010 | Lee | H04J 11/0026 |
| | | | 370/330 |
| 2011/0274205 A1 | 11/2011 | Lee et al. | |
| 2012/0039298 A1 | 2/2012 | Lee et al. | |
| 2012/0287798 A1* | 11/2012 | Sambhwani | H04W 52/16 |
| | | | 370/252 |
| 2013/0120191 A1 | 5/2013 | Zhang et al. | |
| 2013/0308714 A1* | 11/2013 | Xu | H04B 7/0417 |
| | | | 375/267 |

\* cited by examiner

FIG. 4A

VAM pattern 2:

$$\begin{bmatrix} 0 & 0 & 0 & 1 & 0 & 0 & 0 & 1 & 0 & 0 & 0 & 1 \\ 0 & 0 & 1 & 0 & 0 & 0 & 1 & 0 & 0 & 0 & 1 & 0 \\ 0 & 1 & 0 & 0 & 0 & 1 & 0 & 0 & 0 & 1 & 0 & 0 \\ 1 & 0 & 0 & 0 & 1 & 0 & 0 & 0 & 1 & 0 & 0 & 0 \end{bmatrix}$$

VAM pattern 1:

$$\begin{bmatrix} 0 & \cdots & 0 & 0 & \cdots & 0 & 0 & \cdots & 0 & 1 & \cdots & 1 \\ 0 & \cdots & 0 & 0 & \cdots & 0 & 1 & \cdots & 1 & 0 & \cdots & 0 \\ 0 & \cdots & 0 & 1 & \cdots & 1 & 0 & \cdots & 0 & 0 & \cdots & 0 \\ 1 & \cdots & 1 & 0 & \cdots & 0 & 0 & \cdots & 0 & 0 & \cdots & 0 \end{bmatrix}$$

FIG. 4B

VAM pattern 3:

$$\begin{bmatrix} 1 & \cdots & 0 & 0 & \cdots & 0 & 0 & \cdots & 0 & 0 & \cdots & 0 \\ e^{j(L_1-1)\omega_1} & \cdots & 0 & 1 & \cdots & 0 & 0 & \cdots & 0 & 0 & \cdots & 0 \\ 0 & \cdots & 0 & e^{j(L_2-1)\omega_2} & \cdots & 0 & 1 & \cdots & 0 & 0 & \cdots & 0 \\ 0 & \cdots & 0 & 0 & \cdots & 0 & e^{j(L_3-1)\omega_3} & \cdots & 0 & 1 & \cdots & e^{j(L_3-1)\omega_3} \end{bmatrix}$$

FIG. 4C

VAM pattern 4:

$$\begin{bmatrix} 1 & 1 & 1 & 1 \\ e^{j\omega_1} & e^{j\omega_2} & e^{j\omega_3} & e^{j\omega_4} \\ \cdots & \cdots & \cdots & \cdots \\ e^{j(L-2)\omega_1} & e^{j(L-2)\omega_2} & e^{j(L-2)\omega_3} & e^{j(L-2)\omega_4} \\ e^{j(L-1)\omega_1} & e^{j(L-1)\omega_2} & e^{j(L-1)\omega_3} & e^{j(L-1)\omega_4} \end{bmatrix}$$

VIRTUAL ANTENNA MAPPING METHOD AND APPARATUS FOR FEEDBACK OF VIRTUAL ANTENNA MAPPING INFORMATION IN MIMO SYSTEM

PRIORITY

This application claims priority under 35 U.S.C. §119(a) to Korean Patent Application No. 10-2014-0025126, which was filed in the Korean Intellectual Property Office on Mar. 3, 2014, the entire content of which is incorporated herein by reference.

BACKGROUND OF THE INVENTION

1. Field of the Invention

The present invention relates generally to virtual antenna mapping, and more specifically, to a virtual antenna mapping method and apparatus for feedback of virtual antenna mapping information in a Multiple Input Multiple Output (MIMO) system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is implemented in higher frequency (mmWave) bands, e.g., 6 OGHz bands, so as to accomplish higher data rates. To decrease propagation loss of the radio waves and increase the transmission distance, the beamforming, massive Multiple-Input Multiple-Output (MIMO), Full Dimensional MIMO (FD-MIMO), array antenna, and analog beam forming, large scale antenna techniques are discussed in 5G communication systems.

In addition, in 5G communication systems, development for system network improvement is under way based on advanced small cells, cloud Radio Access Networks (RANs), ultra-dense networks, Device-to-Device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and Sliding Window Superposition Coding (SWSC) as an Advanced Coding Modulation (ACM), and Filter Bank Multi Carrier (FBMC), Non-Orthogonal Multiple Access (NOMA), and Sparse Code Multiple Access (SCMA) as an advanced access technology have been developed.

Recently, attention has been paid to Multiple Input Multiple Output (MIMO) technology, in order to increase the system throughput of wireless communication systems using a plurality of antennas. In an initial stage of development of the MIMO technology, interest was focused on techniques for increasing the throughput by increasing the numbers of transmit and receive antennas. However, this interest has been gradually moving towards increasing the number of antennas of a base station, which is more easily changeable in size and complexity than the number of antennas of a mobile terminal, which is constrained in size, power, and antenna extendibility, and complex operation ability. In line with this tendency, the 3$^{rd}$ Generation Partnership Project (3GPP) Release 10, also referred to as Long Term Evolution Advanced (LTE-A), has adopted a transmission scheme of a base station supporting up to 3 antennas. Current studies are focused on a transmission scheme supporting up to 64 antennas in downlink.

Although the number of antennas of a base station has increased to support new transmission modes, legacy transmission modes supporting more restricted numbers of antennas, which are only part, but not all, of the antennas of the base station. For example, when using a legacy transmission mode for 4 antennas and a new transmission mode for 64 antennas, it is necessary for a base station having 64 antennas to convert a signal formatted for 64 antennas to a signal formatted for 4 antennas. In order to accomplish this conversion, there is a need of a Virtual Antenna Mapping (VAM) technology for mapping a relatively large number of physical antennas to a relatively small number of logical antennas.

A virtual antenna mapping technology for mapping 8 antennas to 4 antennas in order for an LTE-A (3GPP Release 10) base station with 8 antennas to use transmission modes designed for an LTE (3GPP Release 8) base station supporting up to 4 antennas has been introduced.

FIG. 1 is a block diagram for explaining a virtual antenna mapper for transmitting the reference signal through a Transceiver Unit (TXRU) and physical antenna in MIMO system.

Referring to FIG. 1, a conventional mapping technology includes mapping up to 8 physical antennas to 4 logical antennas, and the detailed mapping algorithm is determined by the base station independently. The conventional mapping technology maps four transmission signals to 8 physical antennas, and the algorithm of mapping each signal to two antennas is determined by the base station. In the case of M=8 as shown in FIG. 1, assuming the channel between the base station with 8 antennas and the receiver is $h_i$, i=1, ... 8 and the channel after being converted to 4 antennas through application of VAM technology is $g_i$, i=1, ... 4, the transmission mode depicted in FIG. 1 can be expressed as Equation (1):

$$Vh = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix} \begin{bmatrix} h_1 \\ h_2 \\ h_3 \\ h_4 \\ h_5 \\ h_6 \\ h_7 \\ h_8 \end{bmatrix} = \begin{bmatrix} g_1 \\ g_2 \\ g_3 \\ g_4 \end{bmatrix} = g \quad (1)$$

In Equation (1), a matrix V comprised of 1's and 0's is multiplied by a channel vector h, which is the mathematical expression of the virtual antenna mapping technology for converting the legacy transmission mode using M transmit antennas and N receive antennas. When applying the virtual antenna mapping technology, although the number of antennas of the transmitter is greater than the number of antennas of the receiver, the receiver receives data under the assumption that the transmitter has 4 antenna ports.

Such a conventional technology is used effectively when mapping 4 logical antennas (e.g., transmission mode 2 of an LTE system) to 8 physical antennas (e.g., a transmission mode of an LTE-A system).

However, the conventional antenna mapping technology is restricted to the base station implementation issue in association with the detailed mapping and not discussed to the extent of the detailed technical method. This is because the number of cases of the virtual antenna mapping patterns, in the current virtual antenna mapping technology for mapping 8 antennas to 4 antennas, is not likely to contribute to additional performance enhancements.

However, since it is expected that the future wireless communication systems will be extended to scenarios in which base stations are equipped with up to 64 antennas, there is a need of a new virtual antenna mapping technology.

In addition to the transmission modes supporting up to 4 antennas, new transmission modes for supporting more antennas are to be developed for use in association with the new techniques introduced to the LTE network. Base stations that support legacy transmission modes of 4 antennas use the virtual antenna mapping technology in order to address problems resulting from a mismatch in the number of antennas of legacy transmission mode and new transmission mode.

The virtual antenna mapping technology is restricted to a base station implementation issue, but is not actually applied to systems, due to doubts about the cost-effectiveness of performance enhancement by using such technology. However, with a recent increase in the number of antennas of base stations and application of an Active Antenna System (AAS), base stations have become more diversified in order to implement the virtual antenna mapping method, resulting in expectations of performance enhancement. Therefore, there is a need of a new design for supporting modification in the virtual antenna mapping technology other than system designs limited to the base station implementation issue.

SUMMARY OF THE INVENTION

The present invention has been made to address at least the problems and/or disadvantages described above and to provide at least the advantages described below.

An aspect of the present invention provides an enhanced virtual antenna mapping method that is capable of mapping antennas dynamically in a wireless communication system. Another aspect of the present invention provides a system design for feedback of virtual antenna mapping and a transmission method and apparatus of a base station for applying the virtual antenna mapping pattern received from the terminal. Another aspect of the present invention provides a virtual antenna mapping method and apparatus for use in the wireless communication system.

Another aspect of the present invention provides a virtual antenna mapping method and apparatus that is capable of allowing the base station to receive the virtual antenna mapping pattern and apply the received virtual antenna mapping pattern.

In accordance with an aspect of the present invention, a Virtual Antenna Mapping (VAM) method of a base station equipped with M physical antennas and Q Transceiver Units (TXRUs) is provided. The VAM method includes transmitting Reference Signals (RSs) arranged differently according to respective VAM patterns to a terminal in a transmission mode supporting N logical antennas; receiving a feedback including information regarding a VAM pattern selected as a result of channel measurement with respect to the RSs transmitted according to the VAM pattern from the terminal; and transmitting a signal to the terminal through the M physical antennas by applying the selected VAM pattern, wherein the selected VAM pattern maps N data streams corresponding to the N logical antennas to the M physical antennas through the Q TXRUs.

In accordance with another aspect of the present invention, a Virtual Antenna Mapping (VAM) method of a terminal communicating data with a base station equipped with M physical antennas and Q Transceiver units (TXRU) is provided. The VAM method includes estimating a channel based on a Reference Signal (RS) arranged differently according to respective VAM patterns and transmitted by the base station in a transmission mode supporting N logical antennas; selecting a VAM pattern according to a channel measurement result with respect to the estimated channel; and transmitting a feedback including information regarding the selected VAM pattern to the base station, wherein the VAM pattern maps N data streams corresponding to the N logical antennas to the M physical antennas through the Q TXRUs.

In accordance with another aspect of the present invention, a transmission apparatus for performing Virtual Antenna Mapping (VAM) is provided. The transmission apparatus includes a transceiver that includes M physical antennas and Q Transceiver Units (TXRUs); a controller that controls the transceiver to transmit Reference Signals (RSs) arranged differently according to respective VAM patterns to a reception apparatus in a transmission mode supporting N logical antennas, receive a feedback including information regarding a VAM pattern selected as a result of channel measurement with respect to the RS transmitted according to the VAM pattern from the reception apparatus, and transmit a signal to the reception apparatus through the M physical antennas by applying the selected VAM pattern, wherein the selected VAM pattern maps N data streams corresponding to the N logical antennas to the M physical antennas through the Q TXRUs.

In accordance with still another aspect of the present invention, a reception apparatus for performing Virtual Antenna Mapping (VAM) is provided. The reception apparatus includes a transceiver that performs data communication with a transmission apparatus equipped with M physical antennas and Q Transceiver Units (TXRUs); and controller that estimates a channel based on a Reference Signal (RS) arranged differently according to respective VAM patterns and transmitted by the transmission apparatus in a transmission mode supporting N logical antennas, selects a VAM pattern according to a channel measurement result with respect to the estimated channel, and controls the transceiver to transmit a feedback including information regarding the selected VAM pattern to the transmission apparatus, wherein the VAM pattern maps N data streams corresponding to the N logical antennas to the M physical antennas through the Q TXRUs.

BRIEF DESCRIPTION OF THE DRAWINGS

The above and other aspects, features, and advantages of certain embodiments of the present invention will be more apparent from the following detailed description in conjunction with the accompanying drawings, in which:

FIGS. 4A, 4B, and 4C are diagrams illustrating an example of a virtual antenna mapping pattern in the form of a matrix according to an embodiment of the present invention;

DETAILED DESCRIPTION OF EMBODIMENTS OF THE PRESENT INVENTION

Figure 1:
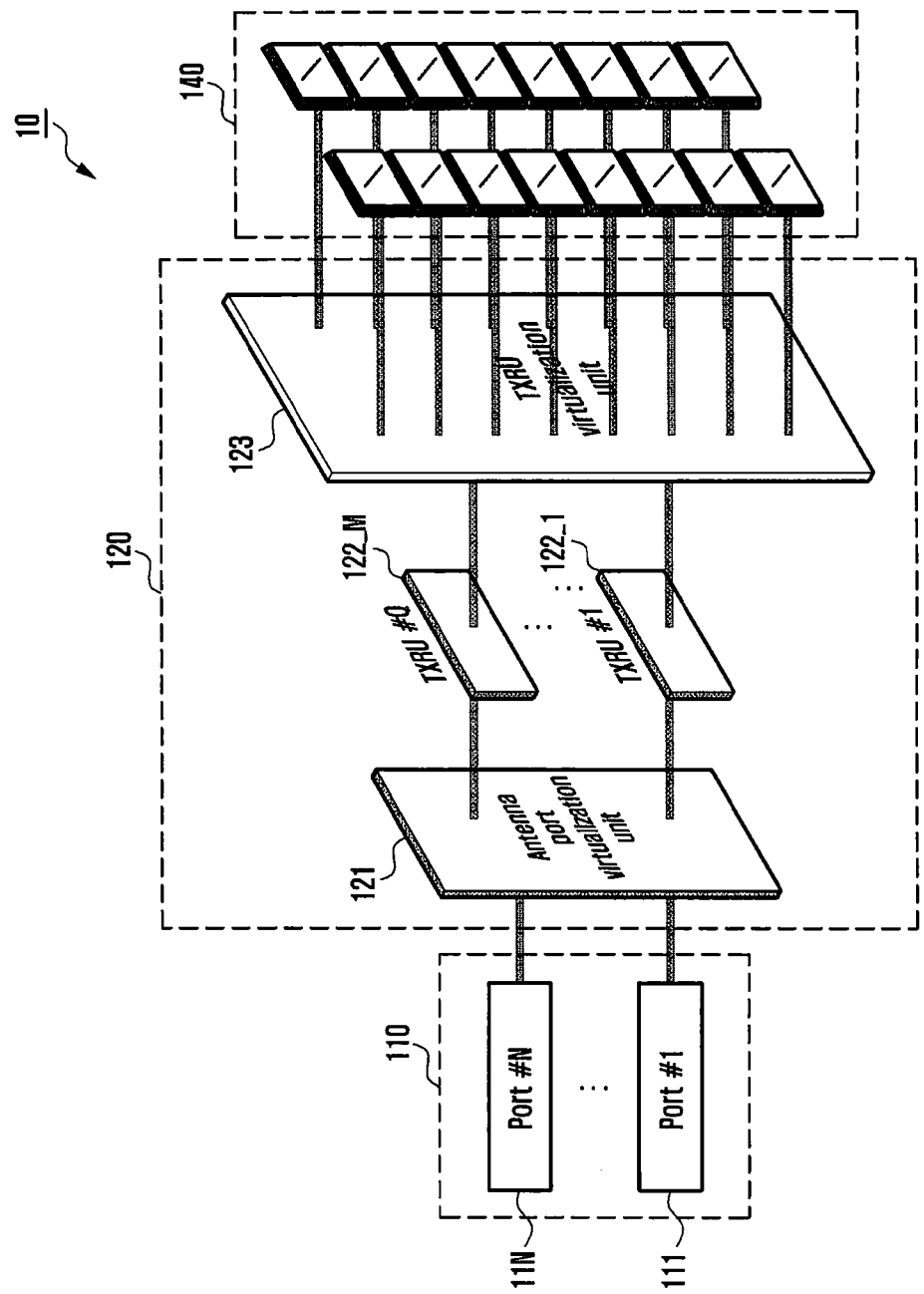
FIG. 1 is a block diagram for explaining a virtual antenna mapper for transmitting the reference signal through TXRU and physical antenna in MIMO system.

Various embodiments of the present invention are described more fully as follows in conjunction with the accompanying drawings. The present invention may have various embodiments, and modifications and changes may be made therein. Therefore, the present invention will be described in detail with reference to particular embodiments shown in the accompanying drawings. However, it should be understood that there is no intent to limit various embodiments of the present invention to the particular embodiments, but the present invention should be construed to cover all modifications, equivalents, and alternatives falling within the spirit and scope of the various embodiments of invention. In connection with descriptions of the drawings, the same or similar components may be designated by the same or similar reference numerals.

Embodiments of the present invention are described with reference to a terminal. Herein, a terminal can be referred to interchangeably as a system, subscriber unit, subscriber station, mobile station, mobile, remote station, remote terminal, mobile device, user terminal, terminal, radio communication device, user agent, user device, and/or User Equipment (UE). A terminal may be any of a cellular phone, Personal Digital Assistant (PDA), handheld device with radio access capability, computing device, and other processing device equipped with a wireless modem.

The terminology herein is merely used for the purpose of describing particular embodiments of the present invention and is not intended to be limiting of the invention. Unless otherwise defined, all terms used herein have the same definition as commonly understood by one of ordinary skill in the art to which this invention pertains, and should be interpreted neither as having an excessively comprehensive definition nor as having an excessively contracted definition.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

The following terms are defined in consideration of the functionality in embodiments of the present invention, and may vary according to the intention of a user or an operator, usage, etc. Therefore, the definition should be made on the basis of the overall content of the present specification.

In the following description, it is assumed that a base station has M antennas and uses a Virtual Antenna Mapping (VAM) technology for supporting the legacy transmission mode using 4 antennas, unless otherwise stated. As shown in FIG. 1, a legacy transmission mode signal may be a signal precoded according to the legacy transmission mode technique. Also, the number of antennas for the legacy transmission mode may change depending on the system used.

FIG. 1 is a block diagram for explaining a virtual antenna mapper for transmitting the reference signal through TXRU and physical antenna in MIMO system.

In the embodiment of FIG. 1, the base station has M physical antennas and Q TXRUs and supports N transmission (Tx) modes using N logical antennas.

Figure 2:
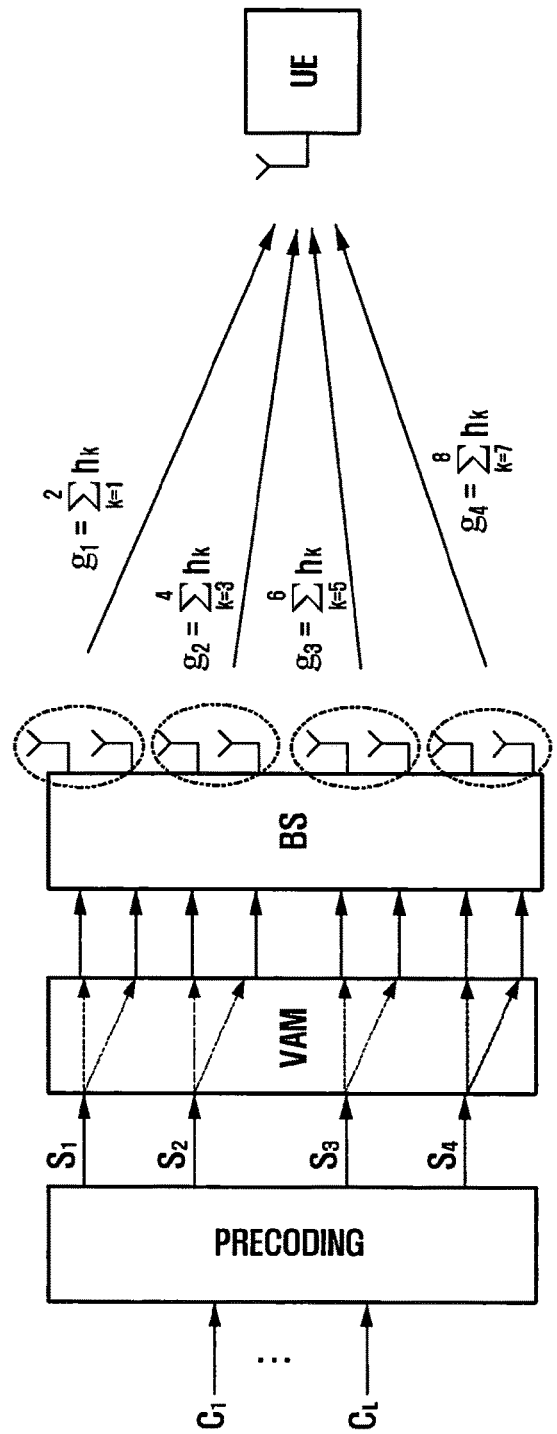
FIG. 2 is a diagram illustrating a conventional virtual antenna mapping scheme in which a base station supporting 4 Tx modes maps the signal to 8 physical antennas according to an embodiment of the present invention.

FIG. 2 is a diagram illustrating a conventional virtual antenna mapping scheme in which a base station supporting 4 Tx modes maps the signal to 8 physical antennas.

Figure 3:
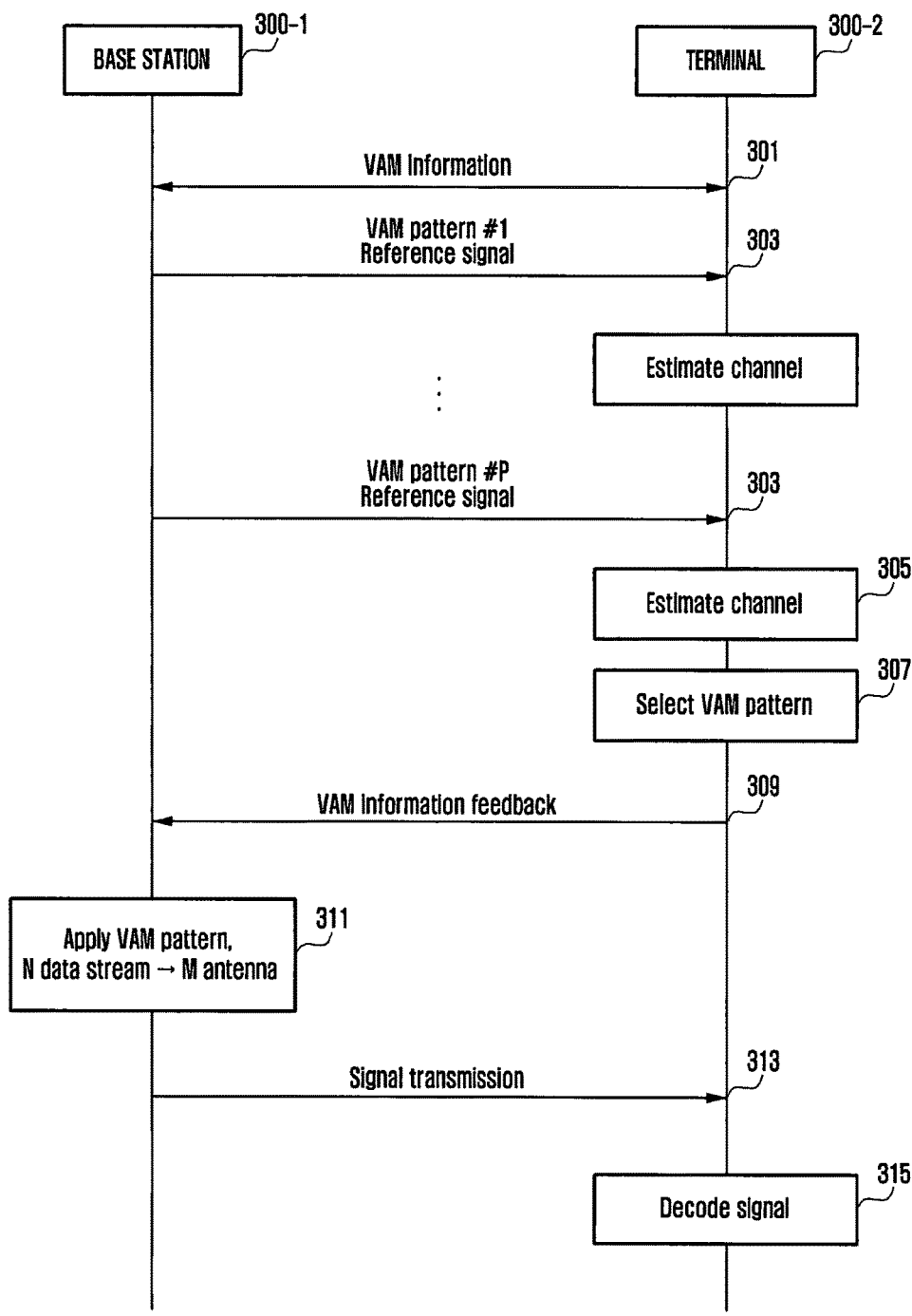
FIG. 3 is a signal flow diagram illustrating the virtual antenna mapping feedback method according an embodiment of the present invention.

FIG. 3 is a signal flow diagram illustrating a virtual antenna mapping feedback method according an embodiment of the present invention.

Referring to FIG. 3, a base station 300-1 and a terminal 300-2 share the VAM information at step 301 The VAM information includes information on at least one VAM pattern, VAM pattern type information, and index information corresponding to each VAM pattern.

The VAM pattern is formed in the shape of a matrix, and the VAM matrix is determined based on the matrix size, overhead, base station antenna type, and channel correlation. According to various embodiments of the present invention, the VAM pattern may be formed in the shape of a matrix having a size of M×N. If the base station 300-1 has M physical antennas and supports 4 Tx modes, the VAM pattern can be formed in various shapes of matrices as shown in FIGS. 4A, 4B, and 4C. The base station 300-1 and the terminal 300-2 may share the VAM matrix itself or the elements of the VAM matrix as the VAM information.

At least one VAM pattern and index information corresponding to the respective VAM pattern is managed in the form of a table. The VAM table is determined based on the feedback overhead, number of bits for use in feedback, number of antennas, antenna structure (co-polarization (co-pol), cross-polarization (cross-pol), Two-Dimensional (2D) array, etc.), antenna correlation, channel correlation, etc. so as to reduce the table size without compromising the VAM performance by taking notice of excessive increase of the number of index candidates.

Figure 5:
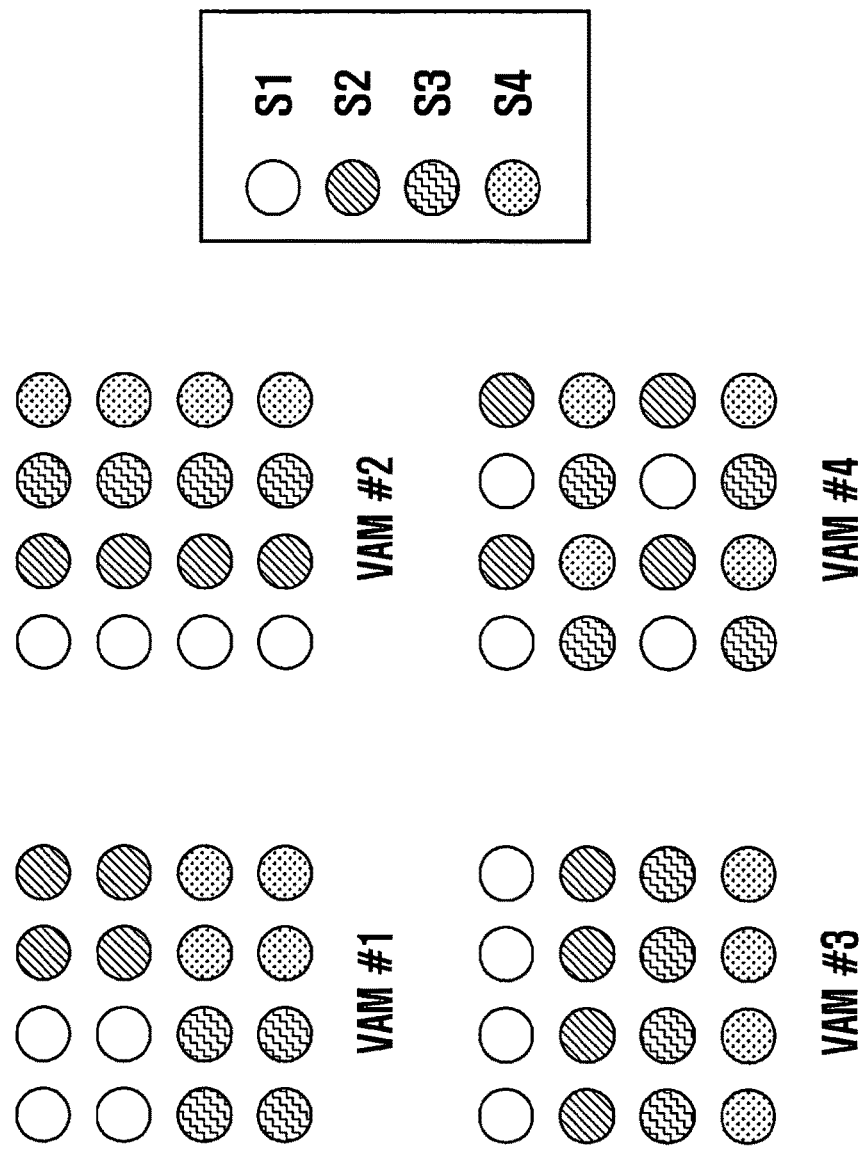
FIG. 5 is a diagram illustrating an virtual antenna mapping table according to an embodiment of the present invention.

FIG. 5 is a diagram illustrating a virtual antenna mapping table according to an embodiment of the present invention.

More specifically, FIG. 5 illustrates a VAM table for the base station 300-1 using 4 logical antennas and 16 physical antennas. The VAM table of FIGS. 4A, 4B, and 4C includes four VAM patterns, which map four data streams S1, S2, S3, and S4 to the 16 physical antennas and the indices VAM#1, VAM#2, VAM#3, and VAM#4 corresponding to the respective VAM patterns.

The VAM matrices and VAM table depicted in FIGS. 4 and 5 are just examples for helping understand embodiments of the present invention, but the VAM matrices and VAM table can be configured in diverse shapes without any limit, in accordance with embodiments of the present invention.

A configuration of the VAM table is described in more detail later with reference to FIG. 7.

The VAM information includes VAM pattern type information, VAM index feedback cycle, elements required for selecting a VAM pattern (e.g., a mapping relationship between a channel state and a VAM pattern), and antenna interval.

The VAM information is configured by the base station 300-1 and transmitted to the terminal 300-2. The base station 300-1 transmits the VAM information to the terminal 300-2 during an initial access or handover procedure through higher layer signaling. Also, the terminal 300-2 configures the VAM information and transmits the VAM information to the base station 300-1. When the VAM information is stored in the terminal 300-2 and the base station 300-1 by the terminal and base station manufacturer, the above-described procedure may be omitted.

Referring back to FIG. 3, the base station 300-1 sends the terminal 300-2 a Reference Signal (RS), at step 303.

The RS is a signal transmitted for use at the terminal 300-2 in measuring a downlink channel state or demodulating a Physical Downlink Shared Channel (PDSCH). The RS is also called a pilot. The RSs are classified into a Cell-specific Reference Signal (CRS) that can be received by the terminals located within the service area of the base station 300-1, a Channel Status Information Reference Signal (CSI-RS) using small resource per antenna port as compared to CRS, and a Demodulation Reference Signal (DM-RS) for use at the terminal 300-2 in demodulating PDSCH scheduled for a predetermined terminal.

The antenna port is a logical antenna that the base station 300-1 uses according to the transmission mode, and the number of antenna ports is determined according to the transmission mode used at the base station 300-1. The base station 300-1 generates as many data streams as the number of antenna ports and, in according to embodiments of the present invention, the data streams are mapped to the physical antennas. The CSI-RS is defined per antenna port, so as to be used for measuring the channel state of a corresponding antenna port. If the same CSI-RS is transmitted through multiple physical antennas, the terminal 300-2 recognizes the physical antennas as one antenna port.

According to an embodiment of the present invention, the base station 300-1 transmits an RS to the terminal 300-2 through M antennas to assist the channel estimation of the terminal 300-2. This reference signal can be used to estimate up to M antenna channels. Although certain embodiments of the present invention are directed to a scenario that includes transmitting the RS for channel estimation at the terminal 300-2, the base station 300-1 may transmit a signal defined separately for use in selecting, at the terminal 300-2, a VAM pattern.

Upon receipt of the RS, the terminal 300-2 estimates a channel state, at step 305.

The terminal 300-2 estimates the downlink channel of the M antennas based on the received RS. According to an embodiment of the present invention, the terminal 300-2 performs channel estimation based on the CSI-RS.

Next, the terminal 300-2 selects the best VAM pattern for the current channel state based on the channel estimation result, at step 307. The terminal 300-2 selects the best VAM pattern based on the VAM information or by measuring the channel measurement resource designated by the base station 300-1 without awareness of the VAM pattern.

According to an embodiment of the present invention, the terminal 300-2 selects a VAM pattern capable of obtaining a maximum channel gain and improving a transmit diversity performance in a current channel state determined based on the channel estimation result. More specifically, the terminal 300-2 may select the VAM pattern that maximizes the minimum channel quality.

According to an embodiment of the present invention, the terminal 300-2 measures multiple channel measurement resources designated by the base station 300-1 and chooses the greatest resource measurement value to select the VAM pattern. The measurement value may be Received Signal Strength Indication (RSSI)/Reference Signal Received Power (RSRP)/Reference Signal Received Quality (RSRQ).

The terminal 300-2 feeds back the information on the selected VAM pattern to the base station 300-1. The terminal 300-2 transmits the VAM index corresponding to the selected VAM pattern in the VAM table to the base station 300-1, at step 309. The terminal 300-2 may also transmit the index of the resource having a greatest measurement value from among a plurality of channel measurement resources designated by the base station 300-1.

This information may be transmitted along with the channel status report or using a newly defined message format. The terminal feedback is not limited in type.

The terminal 300-2 may select a VAM pattern and transmit the selected VAM pattern information to the base station 300-1 periodically or aperiodically.

When the terminal 300-2 provides aperiodic feedback, the terminal 300-2 may transmit the feedback information in response to a request from the base station 300-1 or according to self-determination. For example, if a Negative ACKnowledgment (NACK) is repeatedly received from the terminal 300-2, the base station 300-1 may request the terminal 300-2 to transmit VAM feedback. The terminal 300-2 also selects a VAM pattern and transmits the selected VAM pattern information to the base station 300-1 when a feedback-trigger event occurs. When the VAM pattern must be reselected due to a change in channel quality as a consequence of the channel estimation result, the feedback-trigger event may occur when the channel quality drops below a predetermined threshold. That is, the terminal 300-2 monitors its channel condition and feeds back the preferred antenna mapping pattern dynamically when it is necessary to change the VAM pattern.

When using periodic feedback, the terminal 300-2 may determine the feedback cycle and feedback data size through signaling with the base station 300-1. At this time, the feedback cycle may be determined by taking notice of user distribution, user mobility status, system status, network condition, channel state, and performance change caused by a change of a VAM pattern.

If the VAM pattern information is received from the terminal 300-2, the base station 300-1 maps N data streams to M antennas by applying the VAM pattern based on the feedback information, at step 311. If a VAM index is received from the terminal 300-2, the base station 300-1 may determine the VAM pattern corresponding to the VAM index by referencing the VAM table.

When the selected VAM pattern is configured as matrix $\overline{V}$ with size M×N, if the input data stream is expressed as matrix $\overline{X_V}$ with size N×1, the output data streams mapped to M antennas can be expressed as matrix $\overline{X_P}$ with size M×1 according to Equation (2):

$$\overline{X_P} = \overline{V} \times \overline{X_V} \quad (2)$$

The base station 300-1 processes N input data streams to generate M transmission signals for M antennas using the selected VAM pattern and Equation (2) and maps the transmission signals to M physical antennas.

Next, the base station 300-1 transmits the signal to the terminal 300-2 through M antennas based on the mapping result at step 313. The base station 300-1 maps N data streams to M antennas using the selected VAM pattern to transmit the signal in one of N Tx modes.

Upon receipt of the data from the base station 300-1, the terminal 300-2 decodes the received signals, assuming that the base station 300-1 supports N Tx modes, at step 315.

Figure 6:
FIG. 6 is a diagram illustrating a received signal decoding process of the terminal according to an embodiment of the present invention.

FIG. 6 is a diagram illustrating a received signal decoding process of the terminal according to an embodiment of the present invention.

For example, when the terminal 300-2 receives 8 signals $h_1$ and $h_8$ through 8 antennas and selects the VAM pattern as shown in the left part of FIG. 6, in response to a determination that the base station 300-1 supports 4 Tx modes, the terminal 300-2 decodes the data streams $g_1$ and $g_4$ in one of 4 Tx modes using equations as shown in the right part of FIG. 6 The decoding procedure can be understood more clearly by referencing Equation (1).

The terminal 300-2 and the base station 300-1 may perform the above-described operations repeatedly, in order to receive/transmit data using N Tx modes.

The VAM pattern table-based VAM index feedback method and VAM table generation method are described in detail hereinafter.

Figure 7:
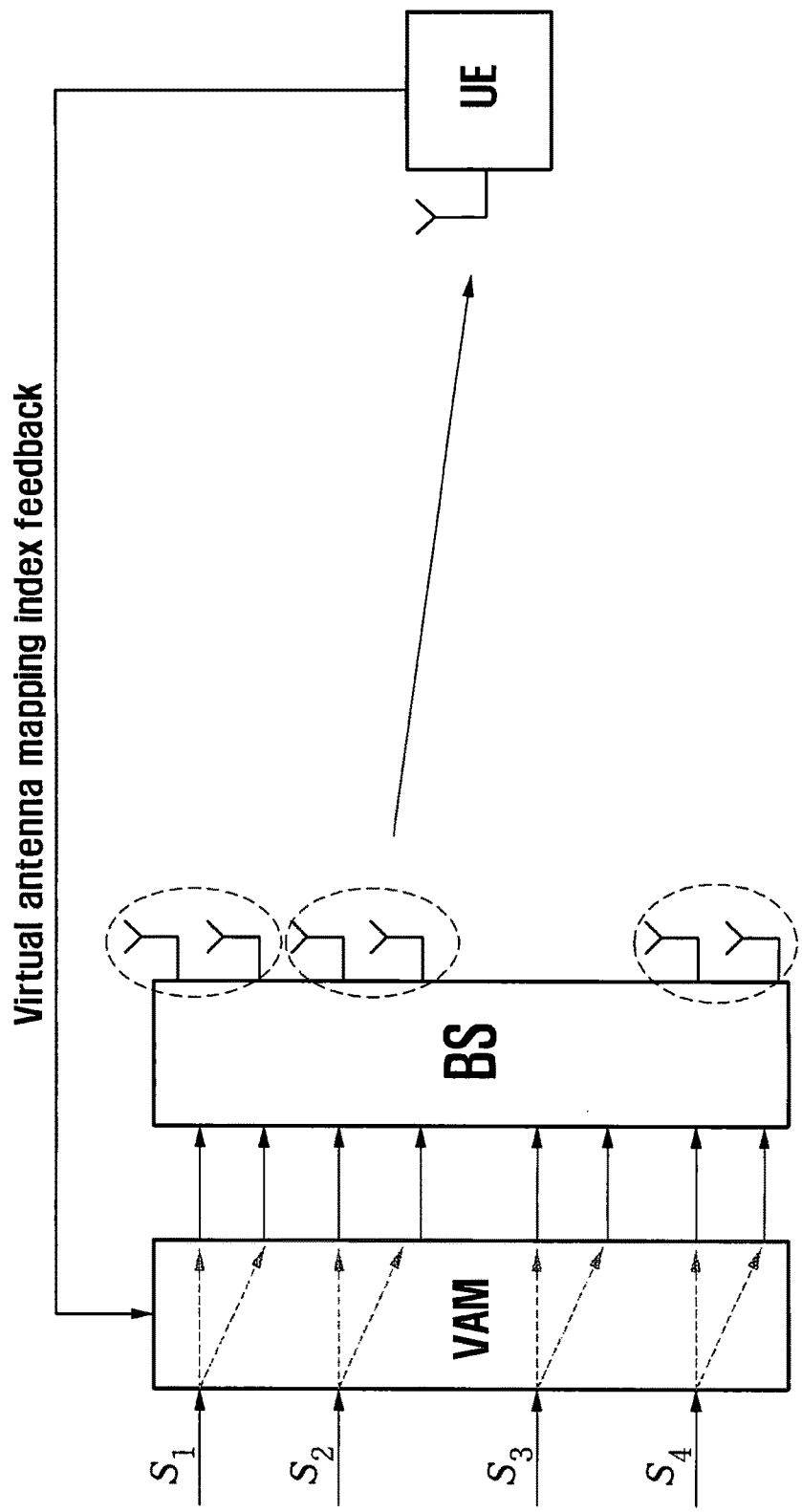
FIG. 7 is a diagram illustrating a concept of a table-based virtual antenna mapping index feedback according to an embodiment of the present invention.

FIG. 7 is a diagram illustrating a concept of a table-based virtual antenna mapping index feedback according to an embodiment of the present invention.

More specifically, FIG. 7 illustrates a VAM index feedback mechanism using a table according to an embodiment of the present invention. In the wireless communication system of FIG. 7, the base station 300-1 has M physical antennas and uses N Tx modes supporting N logical antennas. The embodiment of FIG. 7 are directed to scenario in which M=8 and N=4.

Since M is at least equal to N, the base station 300-1 performs VAM to map N data streams to M antennas, as shown in FIG. 7.

More specifically, FIG. 7 shows an example in which the base station 300-1 supports 4 Tx modes and maps 4 data streams S1, S2, S3, and S4 to the 8 antennas. The VAM table of FIGS. 4A, 4B, and 4C shows an example where the base station 300-1 maps data stream S1 to the first and second antennas, data stream S2 to the third and fourth antennas, data stream S3 to the fifth and sixth antennas, and data stream S4 to the seventh and eighth antennas respectively, according to a specific VAM pattern.

In order to perform VAM, the terminal 300-2 and the base station 300-1 must select an efficient VAM pattern. The VAM pattern is the pattern for determining the antennas to which N data streams are mapped respectively and, according to an embodiment of the present invention, the VAM pattern is expressed in the form of a table. The terminal 300-2 estimates channels for the plurality of virtual antenna patterns of the base station 300-1 and selects one of the virtual antenna mapping patterns from the table or one of a plurality of channel measurement resources designated by the base station 300-1. The terminal 300-2 transmits the index of the selected virtual antenna mapping pattern to the base station 300-1.

Generation of the virtual antenna mapping pattern may be generally substituted by generation of the matrix V of Equation (1). A method of designing matrix V is described hereinafter. Embodiments of the present invention described as follows include non-limiting examples of the virtual antenna mapping information in the table according to embodiments of the present invention.

1) Uniform Usage of Virtual Antenna Mapping Pattern Distributing Transmission Signals of all Antennas When expressing the non-zero element on the $i^{th}$ row and $j^{th}$ column of matrix V as V(i, j), it is possible to use the virtual antenna mapping pattern fulfilling Equations (3) and (4):

$$|V(i, j)| = |V(l, m)|, i \neq l, j \neq m \quad (3)$$

$$\sum_{j=1}^{M} |V(i, j)| = \sum_{m=1}^{M} |V(l, m)| \quad (4)$$

According to Equation (3), that non-zero elements of matrix V are identical in size, and according to Equation (4), the sums of per-row elements are identical in size. As described with reference to Equation (1), when M antenna channels are represented by a vector h, channels after applying the virtual antenna mapping pattern are represented by vector g and matrix V of which entries are all 1, the relationship between the $i^{th}$ antenna after applying the virtual antenna pattern and M antenna channels can be expressed according to Equation (5):

$$g_i = \sum_{k \in P_i} h_k \quad (5)$$

In Equation (5), $P_i$ denotes a set of antennas mapped to the $i^{th}$ antenna through the virtual antenna mapping among M antennas. A virtual antenna mapping pattern proposed according to embodiments of the present invention may use the virtual antenna mapping technology for distributing M antennas uniformly. An example of this mapping pattern expressed as Equation (6):

$$n(P_i) = n(P_j), i \neq j \quad (6)$$

2) Use of a Virtual Antenna Mapping Pattern Binding Adjacent Antennas into One Antenna Port Through a Virtual Antenna Mapping Procedure The virtual antenna mapping pattern is the mapping pattern for binding the adjacent antennas into antenna ports among the M antennas of the base station 300-1. The adjacent antennas may be the consecutively numbered antennas or physically closest antennas. An embodiment of the present invention corresponding to FIG. 8 is directed to an example in which only the antenna numbers are considered in determining the adjacent antennas.

Figure 8:
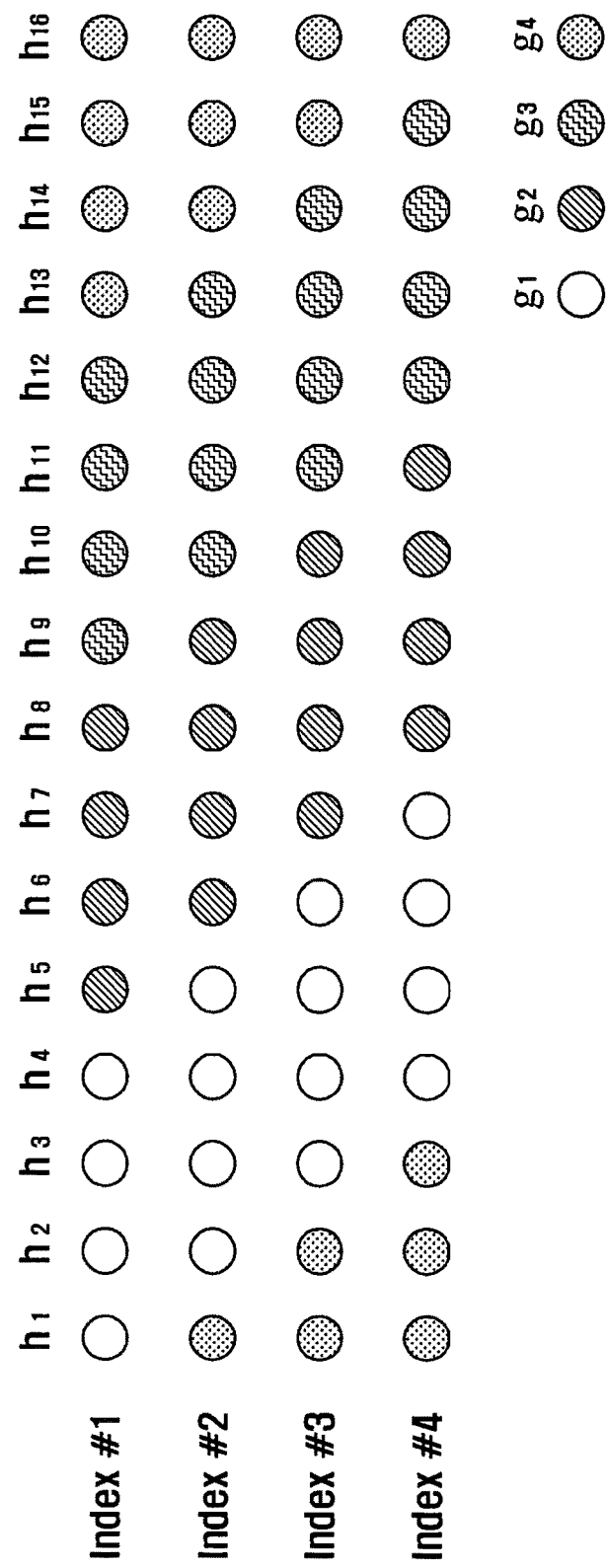
FIG. 8 is a diagram illustrating a concept of virtual antenna mapping through binding adjacent antennas according to an embodiment of the present invention.

FIG. 8 is a diagram illustrating a concept of virtual antenna mapping through binding adjacent antennas according to an embodiment of the present invention.

More specifically, FIG. 8 illustrates the concept of the virtual antenna mapping with 4 antennas by binding adjacent antennas when M=16 according to an embodiment of the present invention.

3) System Changing Virtual Antenna Mapping Pattern According to Antenna Type and Channel Correlation The antenna type may vary depending on the base station 300-1, and the channel correlation between the antennas may vary according to the antenna structure. A virtual antenna mapping pattern table proposed according to an embodiment of the present invention can be modified according to the antenna structure and/or channel correlation between antennas.

Figure 9:
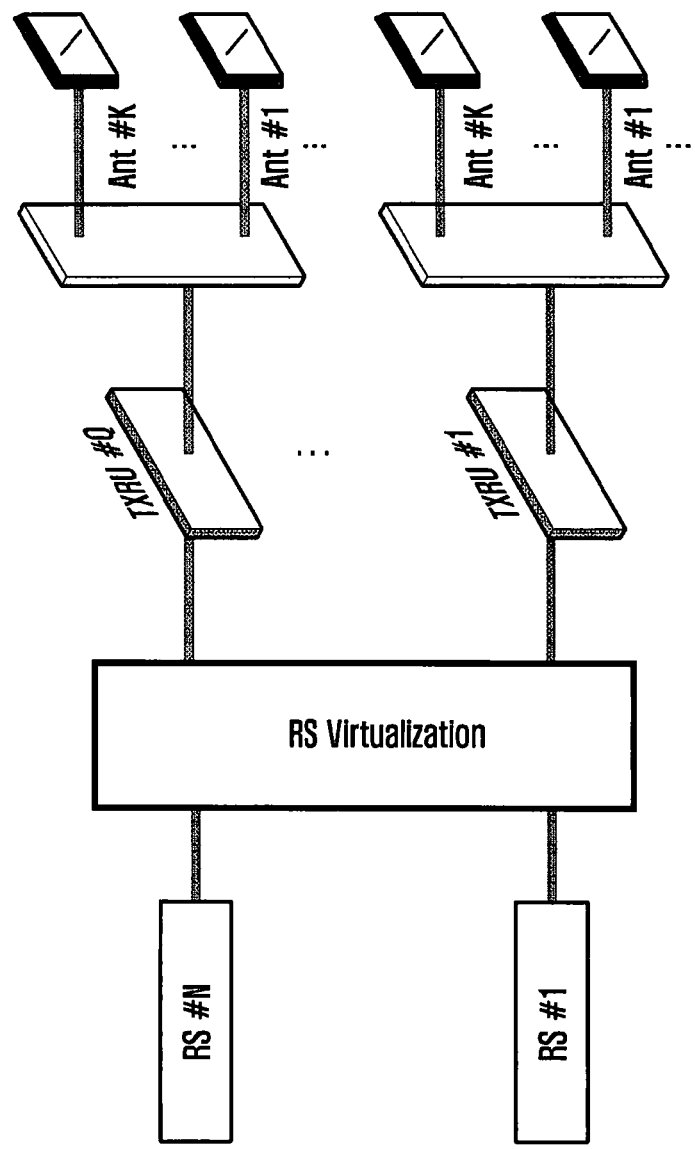
FIG. 9 is a diagram illustrating a scheme of using a pattern mapping TXRU and RS by combining multiple antennas of a base station into several sets of antennas according to an embodiment of the present invention.

4) Use of Virtual Antenna Mapping Pattern for Mapping Antennas in the Form of Subarray Partition in a Virtual Antenna Mapping Procedure FIG. 9 is a diagram illustrating a scheme of using a pattern mapping TXRU and RS by combining multiple antennas of the base station 300-1 into several sets. Referring to FIG. 9, it is possible to use a virtual antenna mapping pattern connecting a plurality of adjacent antennas to one TXRU. This form of mapping is called subarray partition type.

Figure 10:
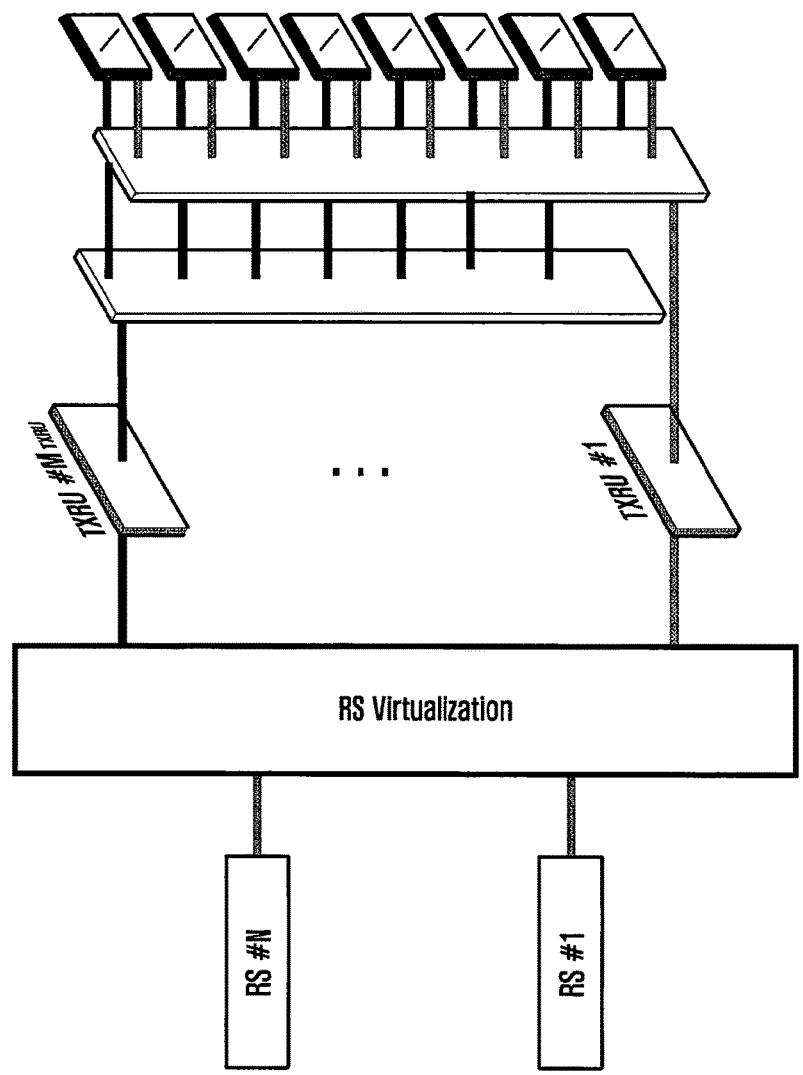
FIG. 10 is a diagram illustrating a scheme of using a pattern mapping TXRU and RX by redundantly using multiple antennas of a base station according to an embodiment of the present invention.

5) Virtual Antenna Mapping Pattern for Mapping Antennas in the Form of Full Connection in a Virtual Antenna Mapping Procedure FIG. 10 is a diagram illustrating a scheme of using a pattern mapping TXRU and RX by redundantly using multiple antennas of the base station 300-1. Referring to FIG. 10, each TXRU may use a virtual antenna mapping pattern for connecting all antennas of constituting one or more columns, all of the antennas, or in another way, and this is called a Full connection type.

According to various embodiments of the present invention, the virtual antenna mapping pattern used by the base station 300-1 may change dynamically. In this case, the legacy users using the legacy network may experience significant channel variation. Therefore, the VAM technology according to an embodiment of the present invention has to be applied along with the consideration on the design of the base station 300-1 without compromising the performance of legacy users.

More specifically, the channel value corresponding to the legacy network antenna port (e.g., a CRS antenna port in an LTE network) changes whenever the virtual antenna mapping information changes in view of the legacy user. Since the legacy user performs feedback of a data decoding result and a channel condition using the channel information estimated for the CRS antenna port, if the CRS antenna port mapping changes temporally, due to the dynamic change of the virtual antenna mapping pattern, this temporary change affects the channel state feedback information significantly.

In order to solve this problem, a transmitter, according to an embodiment of the present invention first adjusts scheduling of the legacy users in consideration of the CRS antenna port mapping pattern to avoid influence to the performance of the legacy users. The transmitter, according to an embodiment of the present invention, is capable of acquiring the CRS pattern information to be received by the legacy user accurately. Accordingly, the transmitter checks the data reception timing and feedback information criteria of the legacy user accurately based on such information. The transmitter is capable of performing resource allocation and data transmission without affecting the performance of a legacy user using the feedback information from the legacy user and the CRS antenna port mapping pattern applied to the corresponding timing.

Secondly, the transmitter, according to an embodiment of the present invention, is capable of using the proposed method by restricting the transmission mode of the legacy user to the operation mode without depending on any feedback. In the current LTE standard, a total of 9 transmission modes are designated. Among them, the transmission modes in which the CRS antenna port mapping pattern information change influences the system throughput are of transmitting data based on the feedback information from the legacy user. However, since the transmit diversity (Transmission Mode #2 (TM2)) and open-loop MIMO (Transmission Mode #3(TM3)) allows for transmission without feedback from the legacy user, it is possible to avoid the impact to the legacy user performance by designing the base station 300-1 to restrict the legacy users to the very transmission modes.

Figure 11:
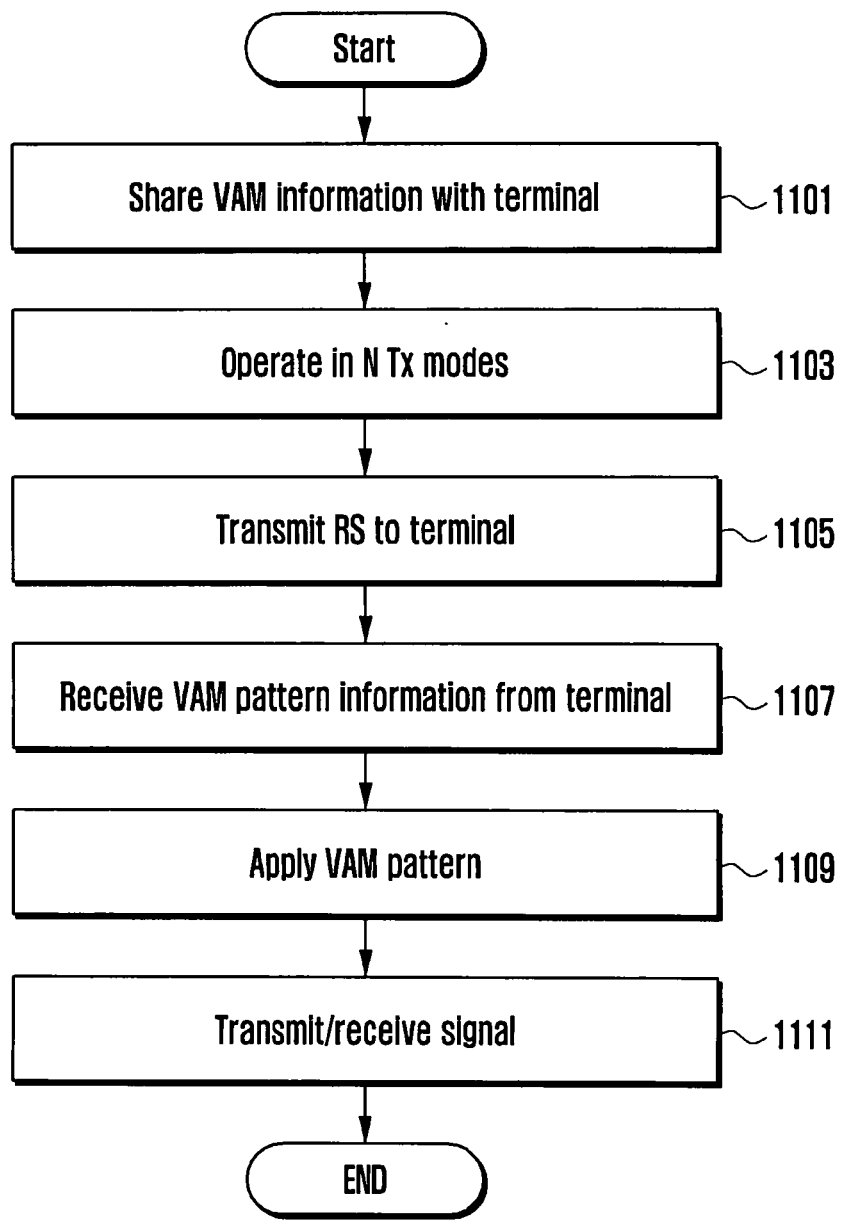
FIG. 11 is a flowchart illustrating a virtual antenna mapping method of a base station according to an embodiment of the present invention.

FIG. 11 is a flowchart illustrating a virtual antenna mapping method of a base station according to an embodiment of the present invention.

Referring to FIG. 11, the base station 300-1 uses M physical antennas.

The base station 300-1 and the terminal 300-2 share VAM information, at step 1101. The VAM information includes the information on at least one VAM pattern and indices corresponding to the respective VAM patterns. The VAM information may be the information regarding an explicit VAM pattern or information modified so as to instruct measurement of the reference signal.

The VAM pattern may be formed in the shape of a matrix, and the VAM matrix (i.e., a matrix-shaped VAM pattern) may be determined based on a size of the matrix, overhead, antenna type of base station, and channel correlation. According to various embodiments of the present invention, the VAM pattern is formed as a matrix with size of M×N.

At least one VAM pattern and the index corresponding thereto may be managed in the form of a table. The VAM table is generated based on the feedback overhead, number of bits used in feedback, number of antennas, antenna structure (co-pol, cross-pol, 2D array, etc.), antenna correlation, channel correlation, etc. for maintaining VAM performance while reducing the table size by taking notice that the number of index candidates increases excessively.

The VAM information may include the number of VAM patterns, feedback type information, VAM index feedback cycle, elements required for selecting a VAM pattern (e.g., a mapping relationship between a channel state and a VAM pattern), and an antenna interval.

The base station 300-1 may generate VAM information to be provided to the terminal 300-2. The base station 300-1 may send, to the terminal 300-2, the VAM information through higher layer signaling in an initial attach or handover procedure of the terminal 300-2. However, the VAM information may be the information regarding the explicit VAM pattern or the modified information instructing the terminal 300-2 to perform measurement of reference signal. The base station 300-1 may receive the VAM information from the terminal 300-2. In the case that the VAM information is stored in the terminal 300-2 and the base station 300-1 by the terminal and base station manufacturer, the sharing procedure may be omitted.

The base station 300-1 selects N Tx modes supporting N logical antennas and operates in one of the Tx modes, at step 1103. The base station 300-1 selects a Tx mode suitable for the current channel state with the terminal 300-2 and operates in the selected Tx mode. More specifically, the base station 300-1 may generate up to N data streams carrying data transmitted to the terminal 300-2. The following example is described under the assumption of M>N.

The base station 300-1 transmits an RS to the terminal 300-2, at step 1105.

The base station 300-1 transmits the RS to the terminal 300-2 through M antennas for channel estimation of the terminal 300-2.

Next, the base station 300-1 receives VAM pattern information transmitted by the terminal 300-2, at step 1107.

The VAM pattern information is the information indicating the VAM pattern selected as a result of the channel estimation performed based on the RS. The VAM pattern information may include a VAM pattern index retrieved from the VAM table. This information also may be the information of selecting a transmission mode suitable for the terminal 300-2 through the reference signal measurement commanded by the base station 300-1 in a state of unawareness of dynamic change of the VAM pattern.

The base station 300-1 may receive the VAM pattern information from the terminal 300-2 aperiodically. In the present example, the base station 300-1 may request the terminal 300-2 for the VAM pattern information aperiodically or command the terminal 300-2 to determine the feedback necessity and report the VAM pattern information autonomously.

The base station 300-1 may also receive the VAM pattern information transmitted by the terminal 300-2 periodically, and the VAM pattern information reception cycle may be determined according to the system environment and performance status according to the change of the VAM pattern.

The base station 300-1 applies the VAM pattern corresponding to the received VAM pattern information at step 1109. The base station 300-1 maps the selected VAM pattern to M antennas by applying the selected VAM pattern.

Figure 12:
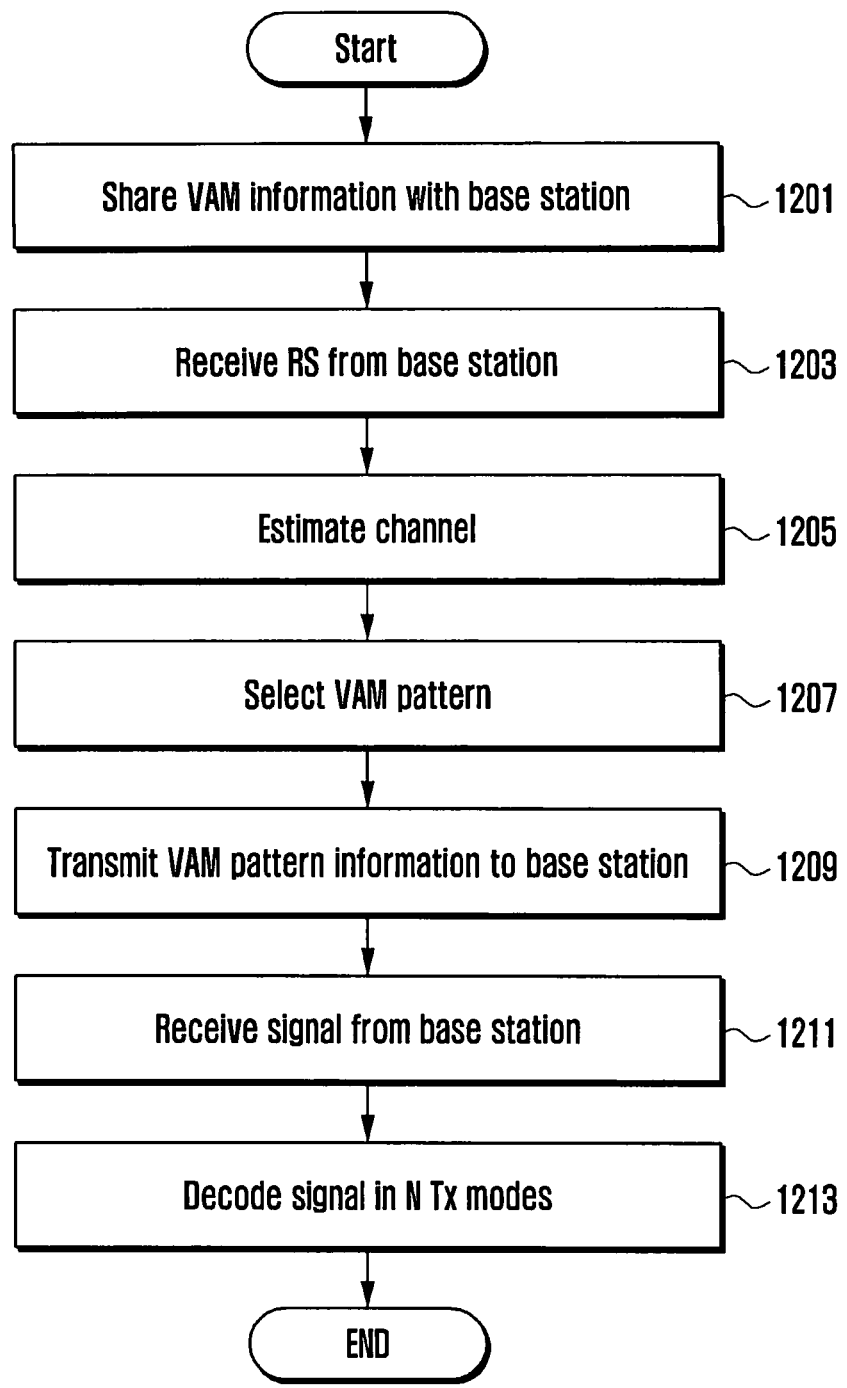
FIG. 12 is a flowchart illustrating a virtual antenna mapping method of a terminal according to an embodiment of the present invention.

Finally, the base station 300-1 supports N Tx modes to transmit and receive signals to and from the terminal 300-2, at step 1111. FIG. 12 is a flowchart illustrating a virtual antenna mapping method of the terminal according to an embodiment of the present invention.

Referring to FIG. 12, the base station 300-1 uses M physical antennas and supports N Tx modes.

The terminal 300-2 shares the VAM information with the base station 300-1, at step 1201. The VAM information may include the information regarding at least one VAM pattern and indices corresponding to the respective VAM patterns.

The VAM pattern may be formed in the shape of a matrix, and the VAM matrix may be determined based on the size of matrix, overhead, antenna type of base station, and channel correlation. According to various embodiments of the present invention, the VAM pattern is formed as a matrix with size of M×N.

At least one VAM pattern and the index corresponding thereto is managed in the form of a table. The VAM table is generated based on the feedback overhead, number of bits used in feedback, number of antennas, antenna structure (co-pol, cross-pol, 2D array, etc.), antenna correlation, channel correlation, etc. for maintaining VAM performance while reducing the table size by taking notice that the number of index candidates increases excessively.

The VAM information may include a VAM index feedback cycle, elements required for selecting a VAM pattern (e.g., a mapping relationship between a channel state and a VAM pattern), and an antenna interval.

The terminal 300-2 may configure and transmit the VAM information to the base station 300-1 and receive the VAM information from the base station 300-1. The terminal 300-2 may share the VAM information with the base station 300-1 through higher layer signaling in the initial attach or handover procedure. When the VAM information is stored in the terminal 300-2 and the base station 300-1 by the terminal and base station manufacturer, the sharing procedure may be omitted.

The terminal 300-2 receives an RS transmitted by the base station 300-1, at step 1203, performs channel estimation using the RS at step 1205. According to an embodiment of the present invention, the terminal 300-2 may perform channel estimation based on CSI-RS.

Next, the terminal 300-2 selects a VAM pattern based on the channel estimation result, at step 1207.

According to an embodiment of the present invention, the terminal 300-2 may select a VAM pattern suitable for obtaining maximum channel gain and transmit diversity gain in the current channel state based on the channel estimation result. More specifically, the terminal 300-2 selects the VAM pattern that is capable of maximizing the minimum channel quality.

According to an embodiment of the present invention, the terminal 300-2 may select the VAM pattern for maximizing the channel capacity. In detail, the terminal 300-2 may select the VAM pattern that is capable of maximizing a Signal-to-Noise Ratio (SNR).

According to an embodiment of the present invention, the terminal 300-2 may select the VAM pattern by measuring plural channel measurement resources designated by the base station 300-1 and selecting the greatest resource measurement value. The measurement value may be RSSI/RSRP/RSRQ.

According to an embodiment of the present invention, the terminal 300-2 may select the VAM pattern randomly using a random selection method or based on the antenna interval. For example, the terminal 300-2 may select the VAM pattern such that the antennas mapped to one data streams are arranged distantly as far as possible.

Next, the terminal 300-2 transmits the selected VAM pattern information to the base station 300-1, at step 1209.

The terminal 300-2 feeds back the selected VAM pattern information to the base station 300-1. The terminal may transmit the VAM index corresponding to the selected VAM pattern to the base station 300-1 using the VAM table.

The VAM pattern may be reported along with the channel state information or in a separately defined message format. The terminal's feedback is limited to any particular method.

The terminal 300-2 selects the VAM pattern and transmits the selected VAM pattern information to the base station 300-1 periodically or aperiodically.

When using aperiodic feedback, the terminal 300-2 may transmit the feedback information in response to a request from the base station 300-1 or according to self-determination. For example, if NACK is received repeatedly from the terminal 300-2, the base station 300-1 may request the terminal 300-2 to transmit VAM feedback. The 300-2 selects a VAM pattern and transmits the selected VAM pattern information to the base station 300-1 when a feedback-trigger event occurs. When the VAM pattern must be reselected due to the change in channel quality as a consequence of the channel estimation result, the feedback-trigger event may occur when the channel quality drops below a predetermined threshold.

When using periodic feedback, the terminal 300-2 may determine the feedback cycle and feedback data size through signaling with the base station 300-1. At this time, the feedback cycle may be determined system status and performance change caused by change of VAM pattern.

Next, the terminal 300-2 receives the signal transmitted by the base station 300-1, at step 1211.

This signal is transmitted through M antennas by mapping N data streams to M antennas according to the VAM pattern information fed back by the terminal 300-2.

The terminal 300-2 decodes the signal received in one of N Tx modes, at step 1213. That is, the terminal 300-2 decodes the received signal under the assumption that the base station 300-1 supports N Tx modes. The terminal 300-2 decodes N data streams based on the information on the number of antennas N used in the Tx mode and the selected VAM pattern.

The terminal 300-2 performs the above procedure repeatedly while the base station 300-1 transmits the data repeatedly in the Tx mode.

Figure 13:
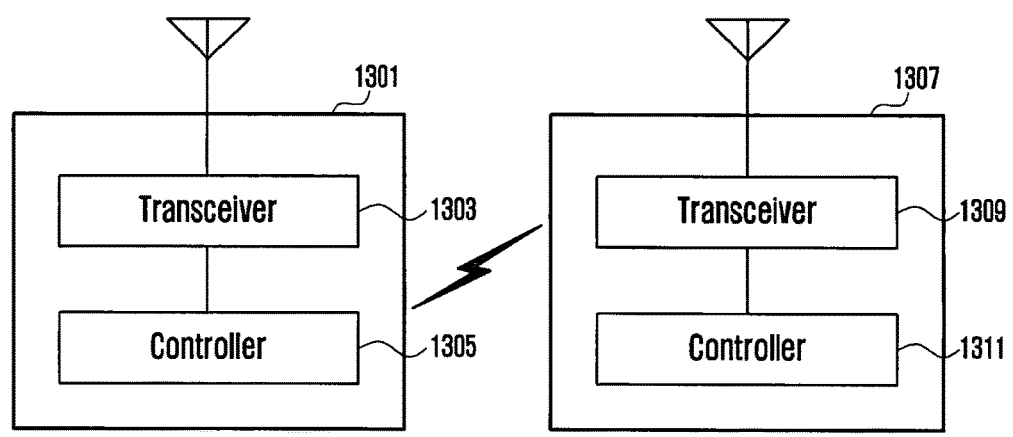
FIG. 13 is a block diagram illustrating configurations of virtual antenna mapping apparatuses according to an embodiment of the present invention.

FIG. 13 is a block diagram illustrating configurations of virtual antenna mapping apparatuses according to an embodiment of the present invention.

Referring to FIG. 13, a transmitter 1301 operating as a virtual antenna mapping apparatus according to an embodiment of the present invention includes a transceiver 1303 and a controller 1305.

The transceiver 1303 performs data communication with at least one receiver 1307. The transceiver 1303 may include M physical antennas according to an embodiment of the present invention.

According to an embodiment of the present invention, the controller 1305 performs virtual antenna mapping in N Tx modes and controls the components of the transmitter 1301. The controller 1305 performs the virtual antenna mapping operation as follows.

According to various embodiments of the present inventions, the transmitter 1301 is a base station.

According to an embodiment of the present invention, the receiver 1307 as a virtual antenna mapping apparatus includes a transceiver 1309 and a controller 1311.

The transceiver 1309 performs data communication with at least one transmitter 1301. The transceiver 1309 performs data communication with the base station 300-1 having M physical antennas in N Tx modes.

The controller 1311 controls the components of the receiver 1307 to perform the virtual antenna mapping according to an embodiment of the present invention. The controller 1311 performs the virtual antenna mapping operation as follows.

According to various embodiments of the present invention, the receiver 1307 may be a user equipment (e.g., a terminal).

As described above, virtual antenna mapping methods and apparatuses according to embodiments of the present invention advantageously improve data communication efficiency and system throughput the transmission modes supporting logical antennas less in number than the physical antennas that can be used by a base station according to the transmission mode of the legacy wireless communication system.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A virtual antenna mapping (VAM) method of a base station equipped with M physical antennas and Q transceiver units (TXRUs), the method comprising:

transmitting, to a terminal, information on at least one VAM pattern, each VAM pattern being associated with mapping between at least one physical antenna and at least one data stream;

transmitting reference signals (RSs) to the terminal;

receiving, from the terminal, a feedback including information regarding a VAM pattern selected among the at least one VAM pattern based on channel measurement with respect to the RSs transmitted; and transmitting a signal to the terminal through the M physical antennas by applying the selected VAM pattern.

2. The method of claim 1, wherein the feedback is received periodically at a feedback interval that is determined based on at least one of a network status, a channel status, and a performance change caused by change of the VAM patterns.

3. The method of claim 1, wherein the feedback is received periodically or aperiodically in response to a request of the base station or when a VAM pattern information feedback event occurs at the terminal.

4. The method of claim 1, wherein the VAM pattern information comprises an index corresponding to the selected VAM pattern that is retrieved from a VAM table that includes the at least one VAM pattern and the index corresponding to the at least one VAM pattern and the VAM table is determined based on at least one of a feedback overhead, a number of bits used for feedback, a number of antennas, an antenna structure, an antenna correlation, and a channel correlation.

5. The method of claim 1, wherein the VAM pattern is one of:

a pattern corresponding a VAM pattern matrix V of which non-zero elements are identical in size and in which sums of sizes of elements of respective rows are identical, and a pattern formed by grouping adjacent antennas among the M physical antennas.

6. The method of claim 1, wherein the VAM pattern changes according to an antenna type and a channel correlation.

7. The method of claim 1, wherein the VAM pattern has a subarray partition type characterized in mapping the TXRUs and the RS by binding multiple antennas into several sets.

8. The method of claim 1, wherein the VAM pattern has a Full connection type characterized in mapping the TXRUs and the RS by redundantly using multiple antennas.

9. A virtual antenna mapping (VAM) method of a terminal communicating data with a base station equipped with M physical antennas and Q transceiver units (TXRUs), the method comprising:

receiving information on at least one VAM pattern, each VAM pattern being associated with mapping between at least one physical antenna and at least one data stream;

estimating a channel based on a reference signal (RS) transmitted by the base station;

selecting a VAM pattern among the at least one VAM pattern based on a channel measurement result with respect to the estimated channel; and transmitting, to the base station, a feedback including information regarding the selected VAM pattern.

10. The method of claim 9, wherein the feedback is transmitted periodically at a feedback transmission interval that is determined based on at least one of a network status, a channel status, and a performance change caused by a change of the VAM patterns.

11. The method of claim 9, wherein the feedback is transmitted aperiodically in response to a request of the base station or when a VAM pattern information feedback event occurs at the terminal.

12. The method of claim 9, wherein the VAM pattern is selected based on at least one of a channel gain, a transmit diversity gain, a minimum channel quality, a channel capacity, a Signal-to-noise ratio (SNR), and an antenna interval, wherein transmitting the feedback comprises:
retrieving an index corresponding to the selected VAM pattern from a VAM table;
acquiring information regarding a largest resource measurement value by measuring a plurality of channel measurement resources; and
transmitting the feedback including the index to the base station, and
wherein the VAM table includes the at least one VAM pattern and the index corresponding to the at least one VAM pattern, and the VAM table is determined based on at least one of feedback overhead, number of bits used for feedback, number of antennas, antenna structure, antenna correlation, and channel correlation.

13. The method of claim 9, wherein transmitting the feedback comprises:
measuring received signal strength indication (RSSI)/reference signal received power (RSRP)/reference signal received quality (RSRQ) on a plurality of channel measurement resources designated by the base station;
selecting a largest resource measurement value; and
transmitting, to the base station, the feedback including the selected resource measurement value,
the channel measurement resources being configured with index information corresponding to the at least one VAM pattern, the terminal feeding back information regarding respective channel measurement resources and transmitting an index of the resource having a largest resource measurement value among the channel measurement resources.

14. The method of claim 9, further comprising:
receiving, from the base station, a signal generated by applying the selected VAM pattern through the M physical antennas; and
decoding the data streams using the selected VAM pattern in the transmission mode.

15. The method of claim 9, wherein the VAM pattern is one of:
a pattern corresponding a VAM pattern matrix V of which non-zero elements are identical in size and in which sums of sizes of elements of respective rows are identical, and
a pattern formed by grouping adjacent antennas among the M physical antennas.

16. A transmission apparatus for performing virtual antenna mapping (VAM), the apparatus comprising:
a transceiver that includes M physical antennas and Q transceiver units (TXRUs);
a controller configured to control the transceiver to transmit, to a reception apparatus, information on at least one VAM pattern, each VAM pattern being associated with mapping between at least one physical antenna and at least one data stream, transmit reference signals (RSs) to the reception apparatus, receive, from a terminal, a feedback including information regarding a VAM pattern selected among the at least one VAM pattern based on channel measurement with respect to the RS transmitted, and transmit a signal to the reception apparatus through the M physical antennas by applying the selected VAM pattern.

17. The transmission apparatus of claim 16, wherein the transceiver receives the feedback periodically at a feedback interval that is determined based on at least one of network status, channel status, and performance change caused by change of the VAM patterns.

18. The transmission apparatus of claim 16, wherein the transceiver receives the feedback aperiodically in response to a request of the transmission apparatus or when a VAM pattern information feedback event occurs at the reception apparatus.

19. The transmission apparatus of claim 16, wherein the VAM pattern information comprises an index corresponding to the selected VAM pattern that is retrieved from a VAM table that includes the at least one VAM pattern and the index corresponding to the at least one VAM pattern and the VAM table is determined based on at least one of a feedback overhead, a number of bits used for feedback, a number of antennas, an antenna structure, an antenna correlation, and a channel correlation.

20. The transmission apparatus of claim 16, wherein the VAM pattern is one of:
a pattern corresponding a VAM pattern matrix V of which non-zero elements are identical in size and in which sums of sizes of elements of respective rows are identical, and
a pattern formed by grouping adjacent antennas among the M physical antennas.

21. A reception apparatus for performing virtual antenna mapping (VAM), the apparatus comprising:
a transceiver that performs data communication with a transmission apparatus equipped with M physical antennas and Q transceiver units (TXRUs); and
a controller configured to control to receive, from the transmission apparatus, information on at least one VAM pattern, each VAM pattern being associated with mapping between at least one physical antenna and at least one data stream, estimate a channel based on a reference signal (RS) transmitted by the transmission apparatus, select a VAM pattern among the at least one VAM pattern based on a channel measurement result with respect to the estimated channel, and control the transceiver to transmit, to the transmission apparatus, a feedback including information regarding the selected VAM pattern,
wherein the VAM pattern maps N data streams corresponding to the N logical antennas to the M physical antennas through the Q TXRUs.

22. The reception apparatus of claim 21, wherein the transceiver controls transmitting the feedback periodically at a feedback transmission interval that is determined based on at least one of a network status, a channel status, and a performance change caused by change of the VAM patterns.

23. The reception apparatus of claim 21, wherein the transceiver transmits the feedback aperiodically in response to a request of the transmission apparatus or when a VAM pattern information feedback event occurs at the reception apparatus.

24. The reception apparatus of claim 21, wherein the controller is further configured to control to select the VAM pattern based on at least one of a channel gain, a transmit diversity gain, a minimum channel quality, a channel capacity, a signal-to-noise ratio (SNR), and an antenna interval, retrieves an index corresponding to the selected VAM pattern from a VAM table, and transmits the feedback including the index to the transmission apparatus, and wherein the VAM table includes the at least one VAM pattern and the index corresponding to the at least one VAM pattern, and the VAM table is determined based on at least one of feedback overhead, number of bits used for feedback, number of antennas, antenna structure, antenna correlation, and channel correlation.

25. The reception apparatus of claim 21, wherein the controller is further configured to control the transceiver to receive a signal generated by applying the selected VAM pattern through the M physical antennas from the transmission apparatus and decodes the data streams using the selected VAM pattern in the transmission mode.

26. The reception apparatus of claim 21, wherein the VAM pattern is one of:

a pattern corresponding a VAM pattern matrix V of which non-zero elements are identical in size and in which sums of sizes of elements of respective rows are identical, and a pattern formed by grouping adjacent antennas among the M physical antennas.

\* \* \* \* \*